No. 81____.
PATENTED MAY 8, 1906.
C. A. A. RAND.
GRAIN DIVIDER ATTACHMENT FOR HARVESTERS.
APPLICATION FILED DEC. 29, 1905.
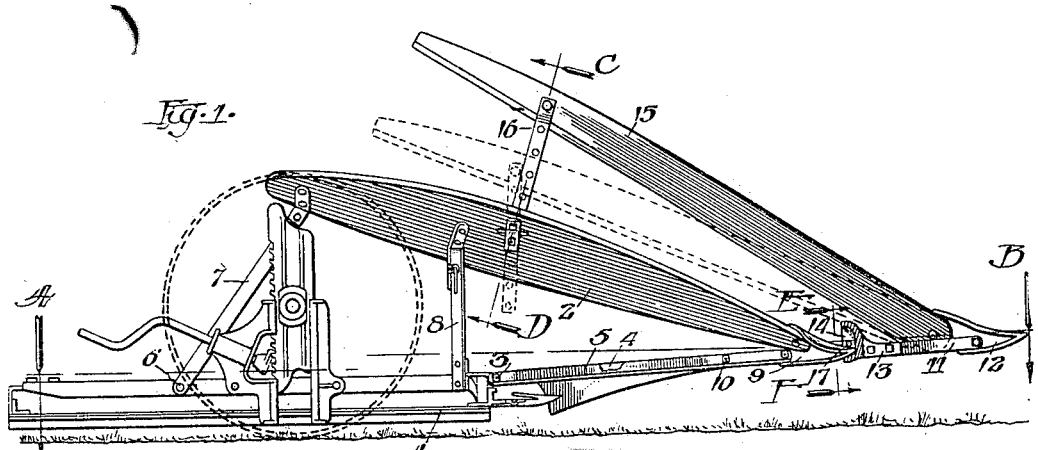
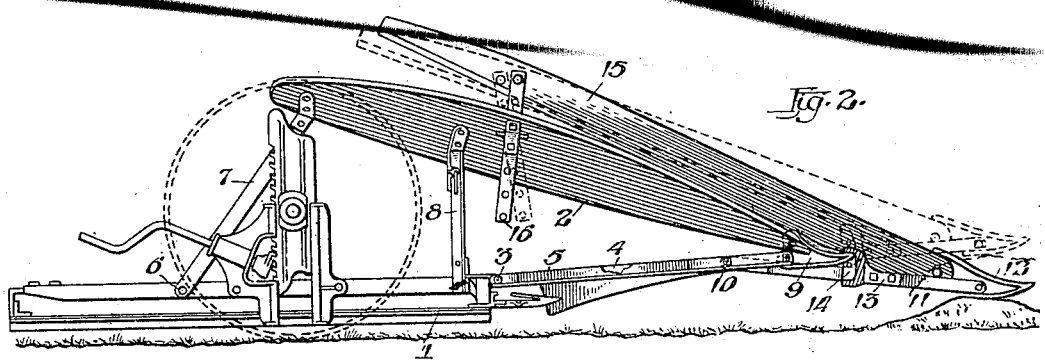
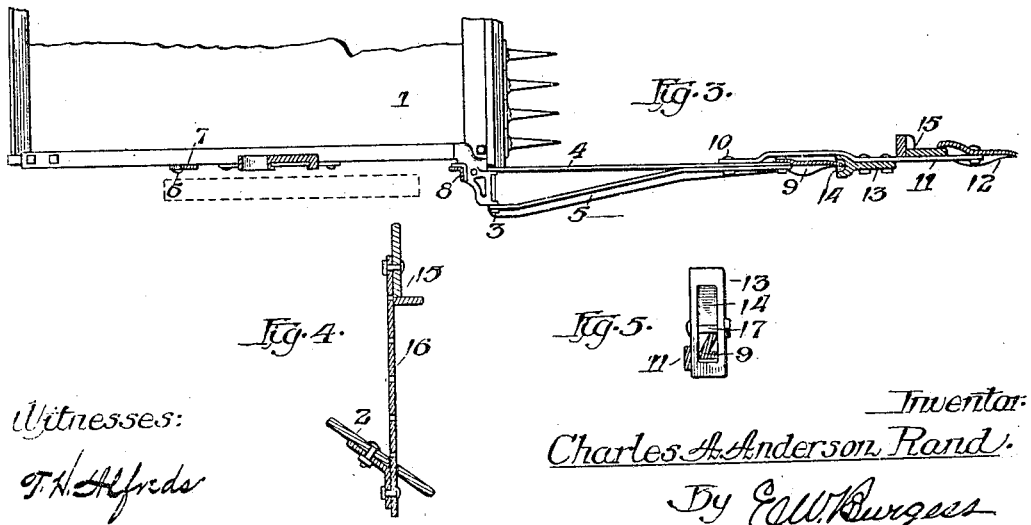
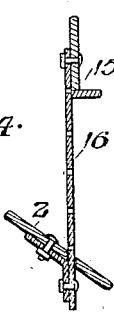
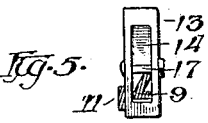
Witnesses:
Inventor:
Charles A. Anderson Rand.
By E.W. Burgess
Attorney.

UNITED STATES PATENT OFFICE.

CHARLES A. ANDERSON RAND, OF CHICAGO, ILLINOIS, ASSIGNOR TO INTERNATIONAL HARVESTER COMPANY, A CORPORATION OF NEW JERSEY.

GRAIN-DIVIDER ATTACHMENT FOR HARVESTERS.

No. 819,797.     Specification of Letters Patent.     Patented May 8, 1906.

Application filed December 29, 1905. Serial No. 293,726.

*To all whom it may concern:*

Be it known that I, CHARLES A. ANDERSON RAND, a citizen of the United States, residing at Chicago, in the county of Cook and State of Illinois, have invented certain new and useful Improvements in Grain-Divider Attachments for Harvesters, of which the following is a specification, reference being had to the accompanying drawings, forming a part thereof.

My invention relates to grain-divider attachments for harvesters in general, and specifically to attachments belonging to that class and having what are commonly called "subdividers" attached to a relatively fixed divider, its object being to provide a subdivider that may be allowed to float at its forward end to a limited extent and by so doing follow the inequalities of the surface of the ground over which it is operated and also be adjustable vertically at its rear end relative to the fixed divider.

To this end the invention consists in the various details of construction and combination of parts hereinafter particularly described and claimed.

In the accompanying drawings, illustrating my invention, Figure 1 is an end view of a harvester-divider with a subdivider embodying my invention attached thereto. Fig. 2 is an end view similar to Fig. 1, showing in full and dotted lines the floating feature of the subdivider. Fig. 3 is a top plan view of a part of Fig. 1 along the line A B. Fig. 4 is a cross-section of Fig. 1 along the line C D, and Fig. 5 is a section of Fig. 1 along the line E F.

Like reference-numerals designate the same parts throughout the several views.

Referring to the drawings, 1 represents the grain-platform, and 2 a grain-divider pivotally connected with the forward edge of the platform at a point 3 by means of the bars 4 and 5 and at an intermediate point 6 between the front and rear sides of the platform by means of the bar 7 and detachably connected to a fixed vertical post 8, secured to the front side of the platform.

The divider is provided with a part 9, to which the forward end of the divider and the forward ends of the bars 4 and 5 are connected, and it forms what is commonly called the "divider-point."

As so far described the attachment is a common one in the art and may be termed a "fixed divider."

Pivotally connected with the bars 4 and 5 at a point 10 intermediate their forward ends and their connection with the platform is the rear end of a forwardly-projecting bar 11, having the point 12 secured to its forward end, and a guide-piece 13, having a vertically-arranged pocket 14, adapted to receive the end of the divider-point 9, is secured to the body portion thereof. A board 15, overlying the divider 2, has its lower end pivotally connected with the point 12 and its rear end pivotally connected with a bar 16, that is adjustably and pivotally connected with the board 2. When constructed in this manner, the subdivider is free to float upon the surface of the ground, its movement being limited by the length of the pocket 14 in the part 13 and its rear end may be adjusted toward or from the divider-board 2. If it be desired to lock the subdivider in its upper operative position, a bolt 17 is passed through the side walls of the pocket 14 above the part 9, as shown in Fig. 5, or the bolt may be placed below the part 9 if it be desired to lock the subdivider in its lower operative position.

What I claim as my invention, and desire to secure by Letters Patent, is—

1. In a grain-divider for harvesters, the combination of a grain-platform, a relatively fixed divider comprising a forwardly-projecting and substantially horizontal member having its rear end secured to said platform, and a supplemental member connected at its forward end with said horizontal member, and extending rearward and upward and having its rear end overhanging said platform and connected therewith, a subdivider comprising a bar having its rear end pivotally connected with said fixed horizontal member intermediate its ends, and a guide secured to said pivoted member and adapted to embrace the forward end of the horizontal member in a manner to limit the pivotal movement of said bar.

2. In a grain-divider for harvesters, the combination of a grain-platform, a relatively fixed divider comprising a forwardly-projecting and substantially horizontal member having its rear end secured to said platform, and a supplemental member connected at its forward end with said horizontal member and extending rearward and upward and having its rear end overhanging said platform and connected therewith, a subdivider comprising a bar having its rear end pivotally connected with said fixed horizontal member intermediate its ends, and a guide secured to one of said members and engaging with the other in a manner to limit the movement of the pivoted bar.

3. In a grain-divider for harvesters, the combination of a grain-platform, a relatively fixed divider comprising a forwardly-projecting and substantially horizontal member having its rear end secured to said platform, and a supplemental member connected at its forward end with said horizontal member and extending rearward and upward and having its rear end overhanging said platform and connected therewith, a subdivider comprising a bar having its rear end pivotally connected with said fixed horizontal member intermediate its ends, and a guide secured to said pivoted member, said guide comprising a vertically-arranged pocket embracing the end of said horizontal member, and a bolt passing through the side walls of the pocket and adapted to lock the pivoted member against movement.

In witness whereof I hereto affix my signature in presence of two witnesses.

CHARLES A. ANDERSON RAND.

Witnesses:
H. G. SCHINDLER,
T. H. ALFREDS.